United States Patent
Koga (10) Patent No.: US 12,155,440 B2
(45) Date of Patent: Nov. 26, 2024

(54) COMMUNICATION DEVICE, CONTROL DEVICE, STORAGE MEDIUM, AND SYSTEM FOR ESTIMATING A POSITIONAL RELATION BETWEEN DEVICES

(71) Applicant: KABUSHIKI KAISHA TOKAI RIKA DENKI SEISAKUSHO, Aichi (JP)

(72) Inventor: Kenichi Koga, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 388 days.

(21) Appl. No.: 17/580,221

(22) Filed: Jan. 20, 2022

(65) Prior Publication Data

US 2022/0255607 A1    Aug. 11, 2022

(30) Foreign Application Priority Data

Feb. 9, 2021  (JP) ................................. 2021-018903

(51) Int. Cl.
| | |
|---|---|
| *H04W 4/02* | (2018.01) |
| *H04B 7/0408* | (2017.01) |
| *H04B 7/06* | (2006.01) |
| *H04W 64/00* | (2009.01) |

(52) U.S. Cl.
CPC ......... *H04B 7/0632* (2013.01); *H04B 7/0408* (2013.01); *H04W 4/023* (2013.01); *H04W 64/00* (2013.01)

(58) Field of Classification Search
CPC .... H04B 7/0632; H04B 7/0408; H04B 7/063; H04B 7/04; H04W 4/023; H04W 64/00; H04W 36/00837; H04W 76/20; H04W 24/06; H04W 36/0083

See application file for complete search history.

(56) References Cited

U.S. PATENT DOCUMENTS

| | | | |
|---|---|---|---|
| 2005/0143100 A1 | 6/2005 | Shi et al. | |
| 2010/0207820 A1 | 8/2010 | Kawano et al. | |
| 2019/0123442 A1* | 4/2019 | Vannucci | ................. H01Q 3/40 |
| 2019/0349280 A1 | 11/2019 | Zhang et al. | |
| 2020/0114875 A1 | 4/2020 | Stitt et al. | |
| 2022/0141684 A1* | 5/2022 | Li | ........................... H04B 17/15 |
| | | | 370/337 |

(Continued)

FOREIGN PATENT DOCUMENTS

| | | |
|---|---|---|
| CN | 1902954 | 1/2007 |
| EP | 2151697 | 2/2010 |

(Continued)

*Primary Examiner* — Wei Zhao
(74) *Attorney, Agent, or Firm* — Greenblum and Bernstein, P.L.C.

(57) ABSTRACT

To provide a novel and improved communication device, control device, program, and system capable of estimating a positional relation between devices with higher accuracy.
A communication device includes a control unit configured to control transmission and reception of signals by at least first and second antennas in conformity with a specific communication standard. The control unit controls a mode for transmission and reception of the signals by the first and second antennas in accordance with the signals transmitted to and received from another communication device.

14 Claims, 7 Drawing Sheets

(56) References Cited

U.S. PATENT DOCUMENTS

2023/0180336 A1\*   6/2023  Lovlekar ......... H04W 36/00837
                                                370/329

FOREIGN PATENT DOCUMENTS

| FR | 2943206 | 9/2010 |
|----|---------|--------|
| JP | 2002-290315 | 10/2002 |
| JP | 5021632 | 9/2012 |
| JP | 2016-176789 | 10/2016 |
| JP | 2017-510794 | 4/2017 |
| JP | 2019-100055 | 6/2019 |
| WO | 2008/029812 | 3/2008 |
| WO | 2015/112430 | 7/2015 |
| WO | 2015/176776 | 11/2015 |
| WO | 2020/077221 | 4/2020 |

\* cited by examiner

COMMUNICATION DEVICE, CONTROL DEVICE, STORAGE MEDIUM, AND SYSTEM FOR ESTIMATING A POSITIONAL RELATION BETWEEN DEVICES

CROSS REFERENCE TO RELATED APPLICATION(S)

This application is based upon and claims benefit of priority from Japanese Patent Application No. 2021-018903, filed on Feb. 9, 2021, the entire contents of which are incorporated herein by reference.

BACKGROUND

The present invention relates to a communication device, a control device, a storage medium, and a system.

In recent years, technologies for causing one device to estimate positions of other devices in accordance with results obtained by transmitting and receiving signals between the devices have been developed. For example, PCT International Publication No. WO 2015/176776 discloses a technology for causing an ultra-wideband (UWB) receiver to estimate a positional relation to a UWB transmitter using a UWB signal.

SUMMARY

In the foregoing system, there is a possibility of a multipath environment of transmitted and received signals affecting estimation accuracy of the positional relation.

Accordingly, the present invention has been devised in view of the foregoing problem and an objective of the present invention is to provide a novel and improved communication device, control device, storage medium, and system capable of estimating a positional relation between devices with higher accuracy.

To solve the foregoing problem, according to an aspect of the present invention, there is provided a communication device including a control unit configured to control transmission and reception of signals by at least first and second antennas in conformity with a specific communication standard. The control unit controls a mode for transmission and reception of the signals by the first and second antennas in accordance with the signals transmitted to and received from another communication device.

To solve the foregoing problem, according to another aspect of the present invention, there is provided a communication device including a control unit configured to control transmission and reception of signals by an antenna in conformity with a specific communication standard. The control unit controls an antenna included in the communication device such that a signal for giving an instruction for control related to a mode for transmission and reception of the signals by at least first and second antennas of another communication device is transmitted to the other communication device in accordance with the signals transmitted to and received from the other communication device.

To solve the foregoing problem, according to still another aspect of the present invention, there is provided a control device including: a control unit configured to control transmission and reception of signals by a plurality of antennas in conformity with a specific communication standard; and an estimation unit configured to estimate a position of a communication partner device based on signals transmitted to and received from the communication partner device by the plurality of antennas and a reliability parameter indicating an index of whether the signals are appropriate as signals used to estimate a positional relation.

According to the above-described aspects of the present invention, it is possible to estimate a positional relation between devices with higher accuracy.

DETAILED DESCRIPTION OF THE EMBODIMENTS

Hereinafter, preferred embodiments of the present invention will be described in detail with reference to the following appended drawings. In the present specification and the drawings, the same reference numerals are given to constituent elements that have substantially the same functional configurations, and description thereof will be omitted.

1. Embodiment 1.1 Exemplary System Configuration

Figure 1:
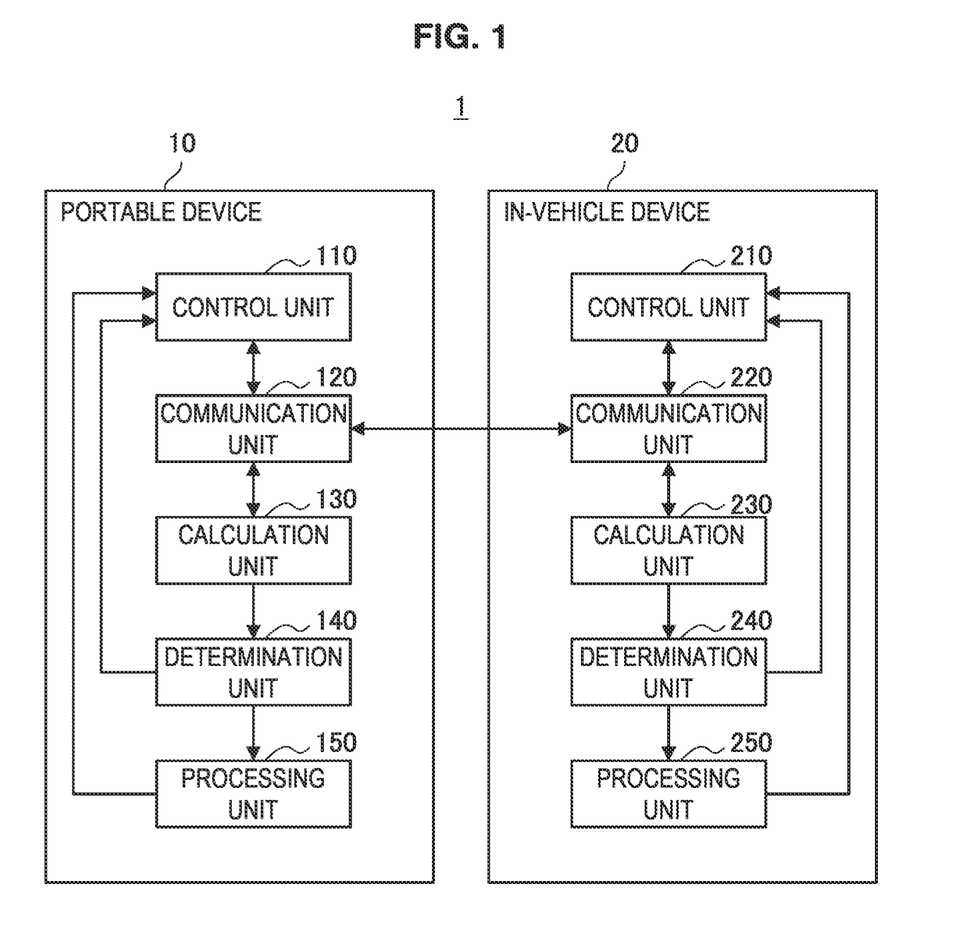
FIG. 1 is a block diagram illustrating an exemplary configuration of a system 1 according to an embodiment.

First, an overall configuration of a system 1 according to an embodiment will be described with reference to FIG. 1. FIG. 1 is a block diagram illustrating an exemplary configuration of the system 1 according to an embodiment.

As illustrated in FIG. 1, the system 1 according to the embodiment includes a portable device 10 and an in-vehicle device 20.

Portable Device 10

The portable device 10 according to the embodiment is an example of a communication device and a control device according to the present invention. The portable device 10 may be, for example, a smartphone, an electronic key, or a wearable terminal. For example, the portable device 10 according to the embodiment is carried by a user and performs transmission and reception of wireless communication with the in-vehicle device 20 mounted in a moving object such as a vehicle used by the user in conformity with specific communication.

As illustrated in FIG. 1, the portable device 10 according to the embodiment includes a control unit 110, a communication unit 120, a calculation unit 130, a determination unit 140, and a processing unit 150.

As an example of a control unit according to the present invention, the control unit 110 controls a general operation in the portable device 10. For example, the control unit 110 controls transmission and reception of wireless signals by at least first and second antennas in conformity with a specific communication standard through an antenna. The specific communication standard includes, for example, an ultra-wideband signal (hereinafter referred to as a UWB signal).

When signals are transmitted to and received from another communication device, the control unit 110 controls a mode for transmission and reception of signals of the first and second antennas.

For example, the control unit 110 controls a mode for transmission and reception of signals by the first and second antennas in accordance with a multi-path environment of signals received from other communication devices. The details of a mode for transmission and reception will be described below.

Functions of the control unit 110 according to the embodiment are implemented by, for example, various processors.

As an example of a communication unit according to the present invention, the communication unit 120 includes, for example, at least first and second antennas and transmits and receives wireless signals in conformity with a specific communication standard through an antenna under the control of the control unit 110.

The communication unit 120 may include three or more antennas. In this case, transmission and reception of wireless signals from antennas included in the communication unit 120 may be performed or transmission and reception of wireless signals from any antenna may be performed.

For example, the communication unit 120 transmits a Poll (polling) signal to the in-vehicle device 20. The communication unit 120 receives a Resp (response) signal transmitted as a reply to the Poll signal from a communication unit 220 included in the in-vehicle device 20. The communication unit 120 transmits a Final signal as a reply to the Resp signal.

As an example of a calculation unit according to the present invention, the calculation unit 130 calculates a reliability parameter indicating whether signals transmitted and received by any antenna included in the communication unit 120 are appropriate as signals used to estimate a positional relation between devices. The details of the reliability parameter will be described below.

As an example of a determination unit according to the present invention, the determination unit 140 determines whether signals used to calculate the reliability parameter are appropriate as signals used to estimate a positional relation between devices based on the reliability parameter calculated by the calculation unit 130.

The processing unit 150 performs a process of estimating a positional relation between the in-vehicle device 20 and the portable device 10 based on signals transmitted and received between the in-vehicle device 20 and the portable device 10. For example, the processing unit 150 may perform a process of estimating an arrival angle of a received signal based on this signal. The processing unit 150 may perform a process of estimating a distance between the in-vehicle device 20 and the portable device 10 based on transmitted and received signals. The processing unit 150 may estimate a 3-dimensional position of the portable device 10 based on an estimated arrival angle of a signal and a distance between the in-vehicle device 20 and the portable device 10.

In-Vehicle Device 20

The in-vehicle device 20 according to the embodiment is an example of a communication device and a control device according to the present invention. The in-vehicle device 20 according to the embodiment may be, for example, a communication unit mounted in a vehicle (for example, a vehicle owned by the user or a vehicle temporarily lent to the user) which the user is permitted to board.

As illustrated in FIG. 1, the in-vehicle device 20 according to the embodiment includes a control unit 210, a communication unit 220, a calculation unit 230, a determination unit 240, and a processing unit 250.

As an example of a control unit according to the present invention, the control unit 210 controls a general operation in the in-vehicle device 20. For example, the control unit 210 controls transmission and reception of wireless signals in conformity with a specific communication standard.

The control unit 210 may control the antenna included in the communication unit 220 such that a signal for giving an instruction for control related to a mode for transmission and reception of signals in at least the first and second antennas of the portable device 10 is transmitted to the portable device 10 in accordance with the multi-path environment of the received signals. In this case, the control unit 110 of the portable device 10 may control the mode for transmission and reception of the signals of the first and second antennas in accordance with an instruction included in a signal received from the in-vehicle device 20.

Functions of the control unit 210 according to the embodiment are implemented by, for example, various processors.

As an example of a communication unit according to the present invention, the communication unit 220 transmits and receives wireless signals, for example, in conformity with a specific communication standard through an antenna. The number of antennas included in the communication unit 220 may be singular or plural. For example, the antenna included in the communication unit 220 may be a four-elements array antenna.

The communication unit 220 receives, for example, a Poll signal from the portable device 10. The communication unit 220 transmits a Resp signal to the portable device 10 as a reply to the Poll signal. The communication unit 220 receives a Final signal transmitted from the portable device 10 as a reply to the Resp signal.

As an example of a calculation unit according to the present invention, the calculation unit 230 calculates a reliability parameter serving as an index indicating whether signals transmitted and received by any antenna included in the communication unit 220 are appropriate as signals used to estimate a positional relation between devices. The details of the reliability parameter will be described below.

As an example of a determination unit according to the present invention, the determination unit 240 determines whether signals used to calculate the reliability parameter are appropriate as signals used to estimate a positional relation between devices based on the reliability parameter calculated by the calculation unit 230.

The processing unit 250 performs a process of estimating a positional relation between the in-vehicle device 20 and the portable device 10 based on signals transmitted and received between the portable device 10 and the in-vehicle device 20. For example, the processing unit 250 may perform a process of estimating an arrival angle of a received signal based on the signal. The processing unit 250 may perform a process of estimating a distance between the portable device 10 and the in-vehicle device 20 based on the transmitted and received signals. Further, the processing unit 250 may estimate a 3-dimensional position of the portable device 10 based on the estimated arrival angle of the signal and the distance between the portable device 10 and the in-vehicle device 20.

The calculation units 130 and 230 may be included in one of the portable device 10 and the in-vehicle device 20. The determination units 140 and 240 and the processing units 150 and 250 may be included in one of the portable device 10 and the in-vehicle device 20 similarly.

The in-vehicle device 20 according to the embodiment is an example of a communication partner device according to the present invention. For example, the antennas 120A and 120B included in the portable device 10 transmit and receive signals to and from a plurality of antennas included in the communication unit 220. The processing unit 150 may estimate a 3-dimensional position of the portable device 10 based on the signals transmitted and received between the plurality of antennas included in the communication unit 220 and the antennas 120A and 120B and the reliability parameter calculated from each signal. When the portable device 10 includes three or more antennas, a 3-dimensional position of the portable device 10 may be estimated using the signals transmitted and received from some or all of the antennas.

The exemplary configuration of the system 1 according to the embodiment has been described above. Next, technical features according to the embodiment will be described with reference to FIG. 2.

2. Technical Features

2.1. Multi-Path Environment

In a process based on signals transmitted and received between the portable device 10 and the in-vehicle device 20, there is a possibility of estimation accuracy of the positional relation deteriorating depending on a radio wave propagation environment.

As an example of such a situation, a case in which multi-paths occur can be exemplified. Multi-paths indicate a state in which radio waves transmitted from a certain transmitter (for example, the portable device 10) arrive at a receiver (for example, the in-vehicle device 20) a plurality of times, and occur when there are a plurality of paths of radio waves between the transmitter and the receiver. In a situation in which the multi-paths occur, there is a possibility of the estimation accuracy of the positional relation deteriorating due to mutual interference of radio waves passing through a plurality of different paths.

On the other hand, since paths of radio waves are different in accordance with positions of antennas of the transmitter transmitting signals, a multi-path environment can vary. That is, when the transmitter includes the plurality of antennas, the plurality of antennas transmit and receive measurement signals, and thus a process of estimating a positional relation between devices can be performed based on signals in which an influence of the multi-paths is further reduced.

Accordingly, in the embodiment, the mode for transmission and reception of signals by the plurality of antennas included in the portable device 10 is controlled in accordance with a multi-path environment of signals received by the portable device 10 or the in-vehicle device 20. Hereinafter, an example of the mode for transmission and reception in accordance with a multi-path environment will be described with reference to FIG. 2.

Figure 2:
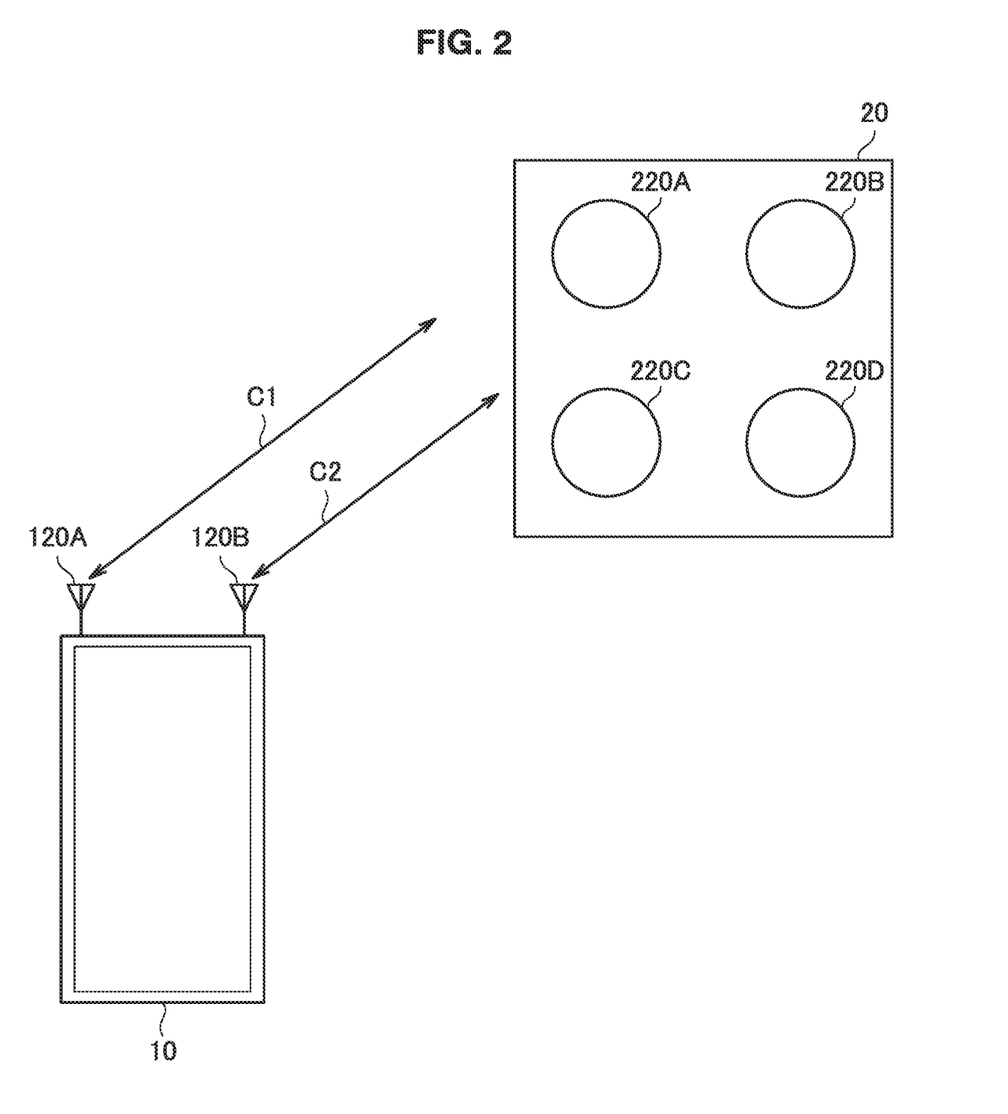
FIG. 2 is a diagram illustrating an exemplary overview of the system according to the embodiment.

FIG. 2 is a diagram illustrating an exemplary overview of the system according to the embodiment. As illustrated in FIG. 2, the portable device 10 includes antennas 120A and 120B disposed at different positions. The in-vehicle device 20 includes antennas 220A, 220B, 220C, and 220D as the communication unit 220.

In FIG. 2, the antennas 120A and 120B included in the portable device 10 are disposed at both the upper left and right ends of the portable device 10, but the positions at which the antennas 120A and 120B are disposed are not limited to this example. For example, the antennas 120A and 120B may be disposed at any positions of the portable device 10 or may be disposed at an interval of about ½ of a wavelength.

A scale ratio of the plurality of antennas of the communication unit 220 and the in-vehicle device 20 is not limited to an illustrated scale ratio either. For example, the antennas 220A, 220B, 220C, and 220D may each be disposed at an interval of about ½ of a wavelength. A disposition shape of the four antennas may be a square, a parallelogram, a trapezoid, a rectangle, or any shape.

The number of antennas included in the communication unit 120 of the portable device 10 may be 3 or more and the number of antennas included in the communication unit 220 of the in-vehicle device 20 may be, for example, 2 or more.

As illustrated in FIG. 2, for example, the antenna 120A may transmit and receive a signal C1 to and from the communication unit 220. In accordance with a multi-path environment of the transmitted and received signal C1, the antenna 120B may transmit and receive a signal C2 to and from the communication unit 220.

For example, when the transmitted and received signal C1 is determined to be in a multi-path environment appropriate for estimation of a positional relation between the in-vehicle device 20 and the portable device 10, the control unit 210 may not control the transmission and reception of the signal C2 through the antenna 120B. In this case, the processing unit 150 may estimate the positional relation between the in-vehicle device 20 and the portable device 10 based on the transmitted and received signal C1.

The processing unit 150 may perform a process of estimating the positional relation between the in-vehicle device 20 and the portable device 10 based on the signals which are in the multi-path environment more appropriate for estimation of the positional relation among the signals transmitted and received by the antennas 120A and 120B.

The example in which the signal is individually transmitted and received by the antenna 120A or 120B of the portable device 10 has been described, but the antennas 120A and 120B may be combined to transmit and receive the signals. For example, the antennas 120A and 120B may be combined to transmit and receive signals with directivity by beamforming. Thus, a path of radio waves between the portable device 10 and the in-vehicle device 20 is limited, and thus it is possible to reduce occurrence of multi-paths.

For example, the antenna 120A of the portable device 10 receives a signal from any antenna of the in-vehicle device 20. The plurality of antennas included in the portable device 10 may transmit signals with directivity in a direction in which the signals are received from the in-vehicle device 20.

Alternatively, the antennas 120A and 120B of the portable device 10 may transmit the above-described signals with directivity at omni-azimuths. In this case, for example, the in-vehicle device 20 may be assumed to be in a direction in which reception power of a signal received from the in-vehicle device 20 is the largest, and the control unit 110 may control transmission and reception of the signals for estimating the positional relation between the portable device 10 and the in-vehicle device 20 in that direction.

2.2. CIR Calculation Process

The communication unit 120 of the portable device 10 and the communication unit 220 of the in-vehicle device 20 according to the embodiment can calculate a channel impulse response (CIR) indicating a feature of a wireless communication path between the communication units 120 and 220.

In the present specification, the CIR is calculated when one (hereinafter also referred to as a transmission side) of the communication units 120 and 220 transmits a wireless signal including a pulse and the other (hereinafter also referred to as a reception side) receives the wireless signal. More specifically, the CIR in the present specification is a correlation calculation result which is a result in which correlation between a wireless signal transmitted by a transmission side (hereinafter also referred to as a transmitted signal) and a wireless signal received by a reception side (hereinafter also referred to as a received signal) is obtained for each delay time which is a time since the transmitted signal was transmitted.

The reception side calculates a CIR by taking sliding correlation between a transmitted signal and a received signal. More specifically, the reception side calculates a value at which correlation between a received signal and a transmitted signal delayed by a delay time is taken as a feature at the delay time (hereinafter also referred to as a CIR value). The reception side calculates a CIR by calculating a CIR value for each delay time. That is, the CIR is a time-series transition of CIR values. Here, the CIR value is a complex number that has I and Q components. A sum of squares of I and Q components of the CIR values is called a power value of the CIR in some cases. In a ranging technology using UWB, a CIR value is also called a delay profile. In the ranging technology using UWB, a sum of squares of I and Q components of CIR values is also called a power delay profile.

Hereinafter, a CIR calculation process in which a transmission side is the in-vehicle device 20 and a reception side is the portable device 10 will be described in detail with reference to FIGS. 3 and 4.

Figure 3:
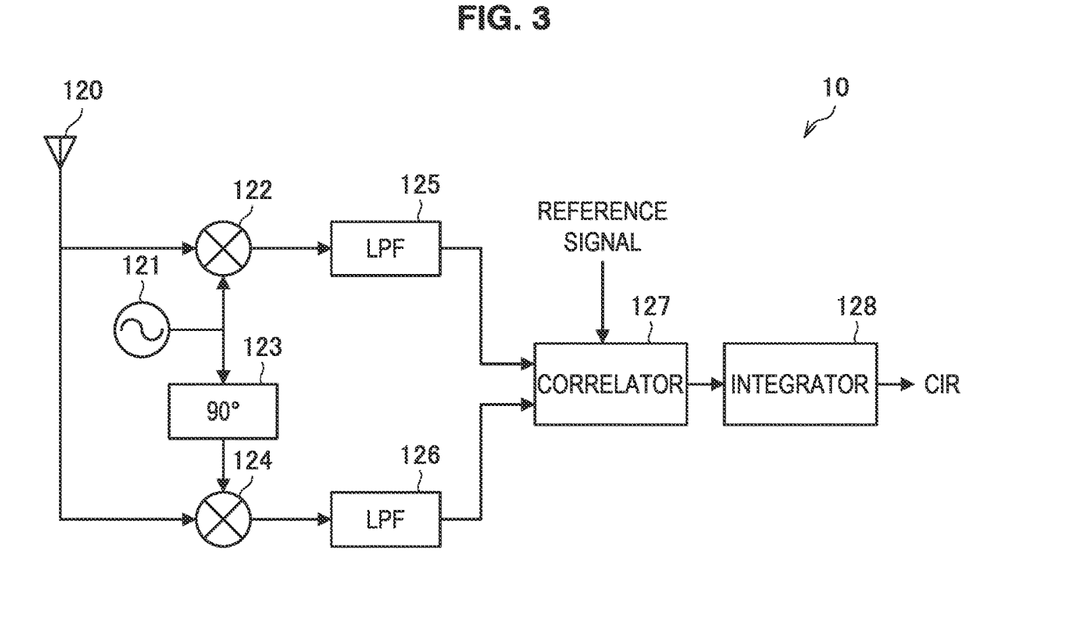
FIG. 3 is a diagram illustrating an example of a communication processing block of a communication unit 120 according to the embodiment.

FIG. 3 is a diagram illustrating an example of a communication processing block of the communication unit 120 according to the embodiment. As illustrated in FIG. 3, the communication unit 120 includes an oscillator 121, a multiplier 122, a 90° phase shifter 213, a multiplier 214, a lowpass filter (LPF) 125, an LPF 126, a correlator 127, and an integrator 128.

The oscillator 121 generates a signal with the same frequency as a frequency of a carrier wave carrying a transmitted signal and outputs the generated signal to the multiplier 122 and the 90° phase shifter 123.

The multiplier 122 multiplies a received signal received by the antenna included in the communication unit 120 by the signal output from the oscillator 121 and outputs a multiplication result to the LPF 125. The LPF 125 outputs a signal with a frequency equal to or less than the frequency of the carrier wave carrying the transmitted signal among input signals to the correlator 127. The signal input to the correlator 127 is an I component (that is, a real part) of the components corresponding to an envelope curve of the received signal.

The 90° phase shifter 123 delays the phase of the input signal by 90° and outputs the delayed signal to the multiplier 124. The multiplier 124 multiplies the received signal received by the antenna included in the communication unit 120 by the signal output from the 90° phase shifter 123 and outputs a multiplication result to the LPF 126. The LPF 126 outputs the signal with the frequency equal to or less than the frequency of the carrier wave carrying the transmitted signal among input signals to the correlator 127. The signal input to the correlator 127 is a Q component (that is, an imaginary part) of the components corresponding to the envelope curve of the received signal.

The correlator 127 calculates the CIR by taking sliding correlation between a reference signal and the received signal formed by the I and Q components output from the LPF 125 and the LPF 126. Here, the reference signal is the same signal as a transmitted signal before the carrier wave is multiplied.

The integrator 128 integrates the CIR output from the correlator 127 and outputs the integrated CIR.

The communication unit 120 performs the foregoing process on each of the received signals received from the plurality of antennas.

Figure 4:
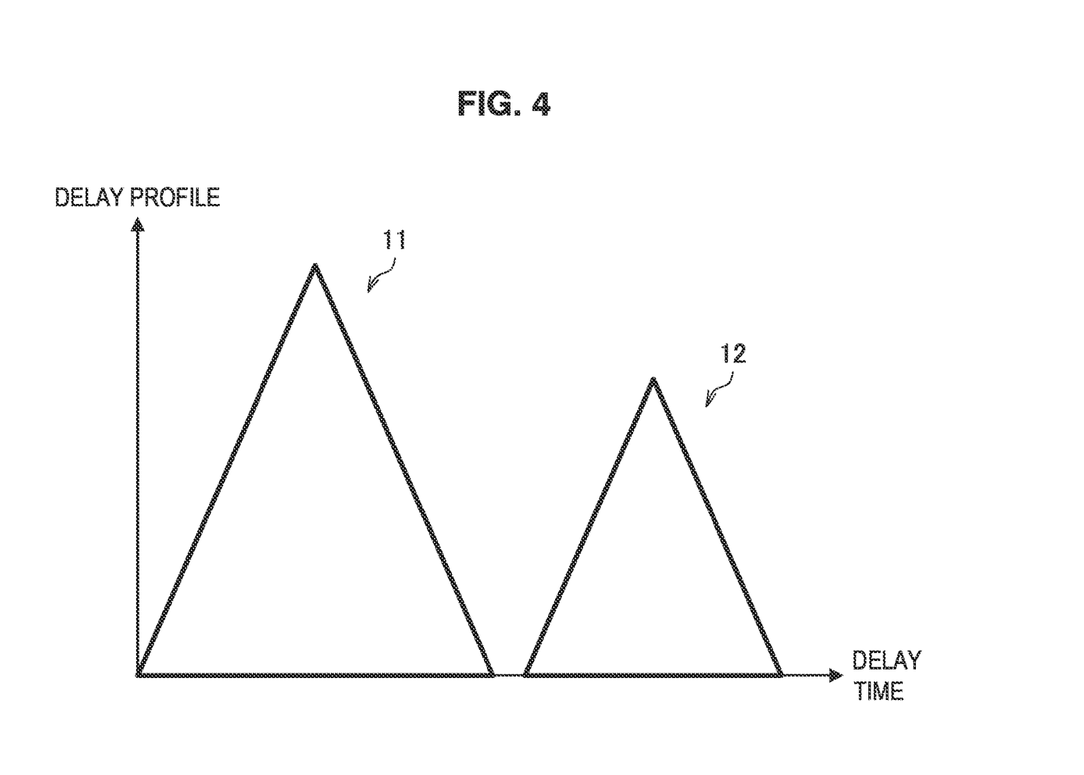
FIG. 4 is a graph illustrating an example of CIR output from an integrator 128 according to the embodiment.

FIG. 4 is a graph illustrating an example of CIR output from the integrator 128 according to the embodiment. In the graph, the horizontal axis represents a delay time and the vertical axis represents a delay profile. As in a CIR value at a certain delay time in the CIR, one piece of information included in information that varies chronologically is also called a sampling point. In the CIR, a set of sampling points between zero cross points generally corresponds to one pulse. The zero cross point is a sampling point of which a value is zero. Here, there is an exception in an environment where there is noise. For example, it may be ascertained that a set of sampling points between intersections of a level serving as a reference except for zero and transition of the CIR values corresponds to one pulse. The CIR illustrated in FIG. 4 includes a set 11 of sampling points corresponding to a certain pulse and a set 12 of sampling points corresponding to another pulse.

The set 11 corresponds to, for example, a pulse of a fast path. The fast path is a shortest path between transmission and reception and is a straight line distance between transmission and reception in an environment where there is no obstacle object. The pulse of the fast path is a pulse arriving at a reception side through the fast path. The set 12 corresponds to, for example, a pulse arrived at the reception side through a path other than the fast path.

A pulse detected as the pulse of the fast path is also called a first incoming wave. The first incoming wave is one of a direct wave, a delay wave, or a combined wave. The direct wave is a signal received directly (that is, without being reflected) on a reception side through a shortest path between transmission and reception. That is, the direct wave is a pulse of a fast path. The delay wave is a signal transmitted and received through a path which is not a shortest path, that is, reflected and received indirectly on the reception side. The delay wave is delayed more than the direct wave and is received by the reception side. The combined wave is a signal received by the reception side in a state in which a plurality of signals passing through a plurality of different paths are combined. In the following description, the first incoming wave is expressed simply as a signal in some cases.

Next, an example of a flow of a process related to estimation of the positional relation between the in-vehicle device 20 and the portable device 10 according to the embodiment will be described.

2.3 Estimating Positional Relation (1) Estimating Distance

At least one of the processing unit 150 included in the portable device 10 and the processing unit 250 included in the in-vehicle device 20 performs a measurement process.

The measurement process is a process of estimating a distance between the in-vehicle device 20 and the portable device 10. The measurement process includes a process of transmitting and receiving a measurement signal and estimating a distance between the portable device 10 and the in-vehicle device 20, that is, a measured value, based on a time taken to transmit and receive a measurement signal. In the following description, an example in which the processing unit 150 included in the portable device 10 performs a measurement estimation process will be described.

In the measurement process, a plurality of measurement signals can be transmitted and received between the in-vehicle device 20 and the portable device 10. A measurement signal transmitted from one device to the other device among the plurality of measurement signals is expressed as a Poll signal. A measurement signal transmitted as a reply to a Poll signal from a device receiving the Poll signal to a device transmitting the Poll signal is expressed as Resp signal. A measurement signal transmitted as a reply to a Resp signal from a device receiving the Resp signal to a device transmitting the Resp signal is expressed as a Final signal.

(2) Estimating Arrival Angle

At least one of the processing unit 150 included in the portable device 10 and the processing unit 250 included in the in-vehicle device 20 estimates an arrival angle of a signal transmitted and received between the devices. In the present specification, the Final signal included in the measurement signals will be described as a signal for estimating an arrival angle. In the following description, an example in which the processing unit 150 included in the portable device 10 performs an arrival angle estimation process will be described.

Hereinafter, an example of a process related to estimation of a distance and estimation of an arrival angle will be described with reference to FIG. 5.

Figure 5:
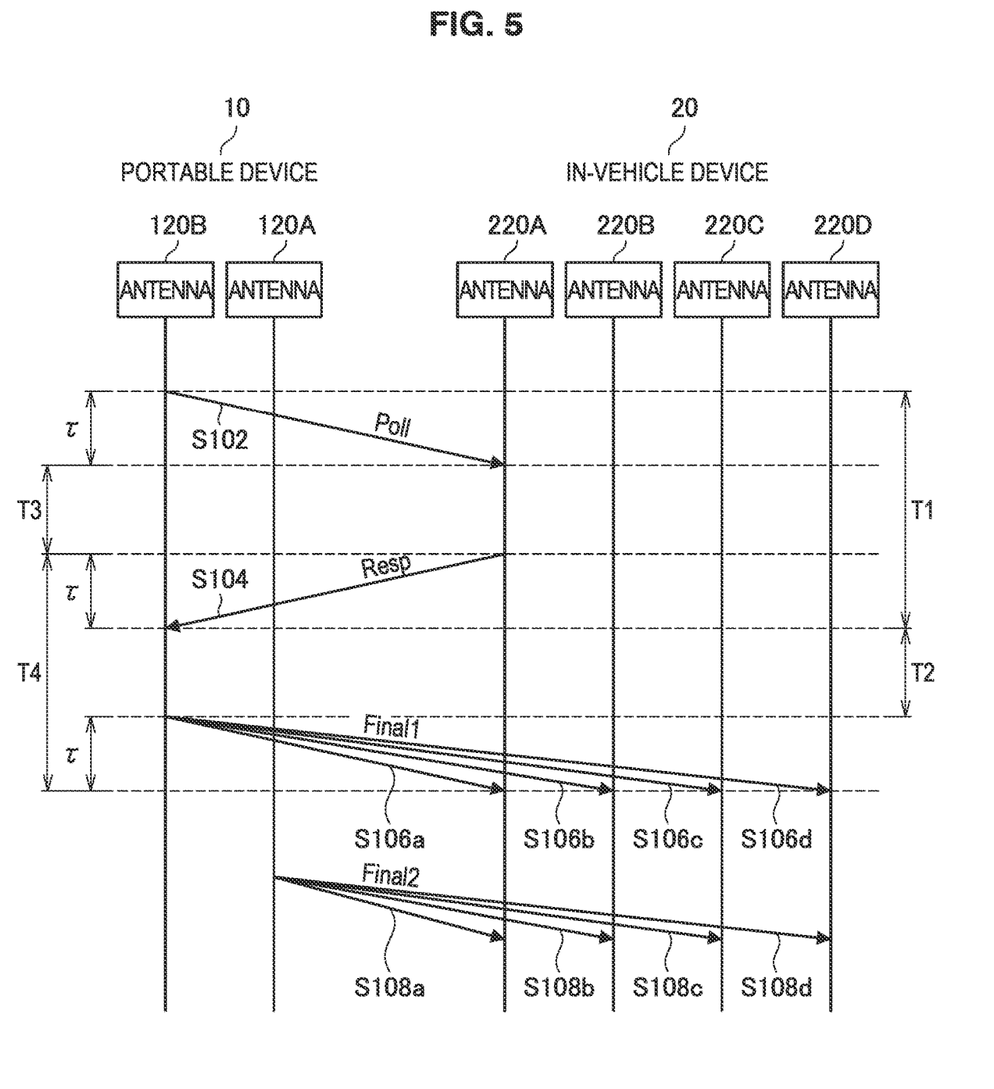
FIG. 5 is a sequence diagram illustrating an example of a process related to inter-device positional relation estimation performed in the system 1 according to the embodiment.

FIG. 5 is a sequence diagram illustrating an example of a process related to inter-device positional relation estimation performed in the system 1 according to the embodiment.

First, the antenna 120A included in the portable device 10 transmits a Poll signal to the antenna 220A included in the in-vehicle device 20 (S102).

Subsequently, the antenna 220A included in the in-vehicle device 20 transmits a Resp signal as a reply to the Poll signal to the antenna 120A included in the portable device 10 (S104).

Then, the antenna 120A included in the portable device 10 transmits a Final1 signal as a reply to the Resp signal to the antennas 220A, 220B, 220C, and 220D included in the in-vehicle device 20 (S106).

Here, for the portable device 10, a time length from transmission of the Poll signal to reception of the Resp signal is a time length T1 and a time length from reception of the Resp signal to transmission of the Final1 signal is a time length T2. Then, for the in-vehicle device 20, a time length from reception of the Poll signal to transmission of the Resp signal is a time length T3 and a time length from transmission of the Resp signal to reception of the Final1 signal is a time length T4.

A distance between the portable device 10 and the in-vehicle device 20 may be calculated using each of the above-described time lengths. For example, the portable device 10 may receive a signal including information regarding the time lengths T3 and T4 from the in-vehicle device 20. For example, the processing unit 150 of the portable device 10 calculates a propagation time z of the signal using the time lengths T1, T2, T3, and T4. For example, the processing unit 150 may calculate the propagation time τ of the signal using the following Expression 1.

$$\tau = (T1 \times T4 - T2 \times T3)/(T1+T2+T3+T4) \quad \text{(Expression 1)}$$

The processing unit 150 may multiply the calculated propagation time τ of the signal by a known speed of a signal and estimate a distance between the portable device 10 and the in-vehicle device 20.

The example in which the processing unit 150 estimates the distance between the portable device 10 and the in-vehicle device 20 based on the signals transmitted and received between the antenna 120A included in the portable device 10 and the antenna 220A included in the in-vehicle device 20 has been described. However, the antenna of the in-vehicle device 20 may transmit and receive the signal using another antenna or the signals may transmit and receive using a plurality of antennas.

The propagation time τ of the signal is not limited to the calculation method using Expression 1. For example, the propagation time of the signal may be calculated by subtracting the time length T3 from the time length T1 and dividing that time by 2.

Subsequently, the arrival angle of the signal may be calculated from a phase difference of the Final signal received by the adjacent antennas among the plurality of antennas. For example, it is assumed that a phase of the Final signal received by the antenna 220A is a phase $P_A$, a phase of the Final signal received by the antenna 220B is a phase $P_B$, a phase of the Final signal received by the antenna 220C is a phase $P_C$, and a phase of the Final signal received by the antenna 220D is a phase $P_D$. In this case, phase differences $Pd_{AB}$ and $Pd_{CD}$ between the antennas adjacent in the X axis direction and phase differences $Pd_{AC}$ and $Pd_{BD}$ between the antennas adjacent in the Y axis direction are expressed using the following Expression 2.

$$Pd_{AB}=(P_B-P_A)$$

$$Pd_{CD}=(P_D-P_C)$$

$$Pd_{AC}=(P_C-P_A)$$

$$Pd_{BD}=(P_D-P_B) \quad \text{(Expression 2)}$$

Here, an angle formed between a straight line connecting the antennas 220A and 220B (or the antennas 220C and 220D) and a first incoming wave is referred to as a formed angle θ. An angle formed between a straight line connecting the antennas 220A and 220C (or the antennas 220B and 220D) and the first incoming wave is referred to as a formed angle Φ. Here, the formed angle θ and the formed angle Φ are expressed in Expression 3. λ is a wavelength of a radio wave and d is a distance between the antennas.

$$\theta \text{ or } \Phi = \arccos(\lambda \times Pd/(2\pi d)) \quad \text{(Expression 3)}$$

Accordingly, when the portable device 10 receives the signals including information regarding a phase difference based on the Final signal from the plurality of antennas included in the above-described in-vehicle device 20, the processing unit 150 calculates an arrival angle of a signal with Expression 4 based on Expressions 2 and 3.

$$\theta_{AB}=\arccos(\lambda \times (P_B-P_A)/(2\pi d))$$

$$\theta_{CD}=\arccos(\lambda \times (P_D-P_C)/(2\pi d))$$

$$\phi_{AC}=\arccos(\lambda \times (P_C-P_A)/(2\pi d))$$

$$\phi_{BD}=\arccos(\lambda \times (P_D-P_B)/(2\pi d)) \quad \text{(Expression 4)}$$

The processing unit 150 may calculate an average value of $\theta_{AB}$ and $\theta_{CD}$ as the formed angle $\theta$ and may estimate one of $\theta_{AB}$ and $\theta_{CD}$ as the formed angle $\theta$. Similarly, the processing unit 150 may calculate an average value of $\phi_{AC}$ and $\phi_{BD}$ as the formed angle $\phi$ and may estimate one of $\phi_{AC}$ and BD as the formed angle $\phi$.

The processing unit 150 may estimate a 3-dimensional position of the portable device 10 using the estimated distance and the formed angle $\theta$ or the formed angle $\phi$.

For example, a coordinate system in which a straight line connecting the antenna 220A to the antenna 220B is the X axis, a straight line connecting the antenna 220A orthogonal to the X axis to the antenna 220C is the Y axis, and a perpendicular direction of the antenna 220A is the Z axis is defined.

In the case of the coordinate system, for example, the processing unit 150 may estimate the 3-dimensional position of the portable device 10 using Expression 5.

$$x = R \times \cos\theta$$
$$y = R \times \cos\phi$$
$$z = \sqrt{(R^2 - x^2 - y^2)} \quad \text{(Expression 5)}$$

As described above, the processing unit 150 can estimate a positional relation between the portable device 10 and the in-vehicle device 20 based on the signals transmitted and received between the antenna 120A of the portable device 10 and the plurality of antennas of the in-vehicle device 20. On the other hand, in accordance with a multi-path environment occurring between the antenna 120A of the portable device 10 and the plurality of antennas of the in-vehicle device 20, there is a possibility of estimation accuracy of the positional relation deteriorating.

Accordingly, based on signals received by the antenna 120A of the portable device 10 and any of the antennas of the in-vehicle device 20, the calculation unit 130 or 230 calculates a reliability parameter indicating an index of whether the signals transmitted and received between the antenna 120A of the portable device 10 and the plurality of antennas of the in-vehicle device 20 are appropriate as processing targets for estimating the positional relation. The processing unit 150 or 250 can estimate the positional relation between the portable device 10 and the in-vehicle device 20 with higher accuracy by using a signal in which the reliability parameter satisfies a predetermined reference to estimate the positional relation.

A certain device may transmit and receive the Poll signal, the Resp signal, and the Final signal. For example, any of the antennas included in the in-vehicle device 20 transmits the Poll signal and the antenna included in the portable device 10 transmits the Resp signal.

As illustrated in FIG. 5, the Final signal may be transmitted and received from any one antenna between the antennas 120A and 120B included in the portable device 10, or the Final signal may be transmitted and received from both the antennas. For example, as illustrated in FIG. 5, the antenna 120A transmits the Final1 signal to the plurality of antennas included in the in-vehicle device 20 (S106) and the antenna 120B may transmit a Final2 signal to the plurality of antennas included in the in-vehicle device 20. The processing unit 150 may estimate an arrival angle of the signal based on each of the Final1 signal and the Final2 signal and may calculate, for example, an average value of estimation results of arrival angels of the signals. Thus, the processing unit 150 can estimate the positional relation between the portable device 10 and the in-vehicle device 20 with higher accuracy.

Hereinafter, an example of the reliability parameter calculated by at least one of the calculation units 130 and 230 will be described.

2.4. Reliability Parameter

The calculation unit 130 of the portable device 10 or the calculation 230 of the in-vehicle device 20 according to the embodiment calculates the reliability parameter based on a received signal.

The reliability parameter is an index indicating whether a signal received by any of the antennas of the communication unit 120 or the communication unit 220 is appropriate as a processing target for estimating the positional relation. For example, the reliability parameter is a continuous value or a discrete value, and indicates that the signal transmitted or received by the antenna is appropriate as the processing target for estimating the positional relation as the value is higher and indicates that the signal is not appropriate as the processing target for estimating the positional relation as the value is lower. Of course, the opposites may be implemented. Hereinafter, a specific example of the reliability parameter will be described.

Index Indicating Magnitude of Noise

The reliability parameter may be, for example, an index indicating magnitude of noise. More specifically, the calculation unit 130 may calculate the reliability parameter based on at least one of a power value of a signal received by the communication unit 120 and a signal noise ratio (SNR). When the power value or the SNR is high, an influence of noise is small. Therefore, a reliability parameter indicating that a first incoming wave is appropriate as a detection target is calculated. Conversely, when the power value or the SNR is low, the influence of noise is considerable. Therefore, a reliability parameter indicating that the first incoming wave is not appropriate as a detection target may be calculated.

Index Indicating Validity of First Incoming Wave which is Direct Wave

The reliability parameter is an index indicating validity of the first incoming wave which is the direct wave. The higher the validity of the first incoming wave which is the direct wave is, the higher the reliability is. The lower the validity of the first incoming wave which is the direct wave is, the lower the reliability is.

For example, the reliability parameter may be calculated based on consistency between signals of the plurality of antennas included in the communication unit 220 of the in-vehicle device 20. More specifically, the calculation unit 130 may calculate the reliability parameter based on at least one of a reception time and a power value of a signal of each of the plurality of antennas included in the communication unit 220. Due to an influence of multi-paths, a plurality of signals arriving via different paths may be combined and received by the antennas in a state in which the signals are amplified or offset. When amplification and offsetting of the signals are different in the plurality of antennas, reception times and power values of the signals differ between the plurality of antennas. When a distance between the antennas which is a close distance of ½ of a wavelength of an arrival angle estimation signal is taken into consideration, a large difference in the reception time and the power value of the signal between the antennas 220A, 220B, 220C, and 220D indicates that validity of the signal which is a direct wave is low.

Index Indicating Validity of First Incoming Wave which is not Combined Wave

The reliability parameter may be an index indicating validity of the first incoming wave which is not a combined wave. The higher the validity of the first incoming wave which is not a combined wave is, the higher the reliability is. The lower the validity of the first incoming wave which is not a combined wave is, the lower the reliability is. Specifically, the reliability parameter may be calculated based on at least one of the width of the first incoming wave in a time direction and a phase state of the first incoming wave.

Index Indicating Validity of Reception of Situation of Wireless Signal

The reliability parameter may be an index indicating validity of a reception situation of a wireless signal. The higher the validity of the reception situation of the wireless signal is, the higher the reliability is. The lower the validity of the reception situation of the wireless signal is, the lower the reliability is.

For example, the reliability parameter may be calculated based on a variation in the plurality of first incoming waves. In this case, the reliability parameter may be calculated based on statistical amounts indicating a variation in the plurality of first incoming waves, such as a dispersion of power values of the first incoming waves and a dispersion of change amounts of estimated position parameters (the distance, the formed angles θ and φ, and coordinates (x, y, z)).

Difference Between Delay Time of First Component and Delay Time of Second Component The reliability parameter may be a difference between a delay time of a first component of the CIR and a delay time of a second component of the CIR. The first component has a peak CIR value for the first time after a specific component, and the second component has a peak CIR value for the second time after the specific component. As illustrated in FIG. 4, a CIR waveform of the first incoming wave is a waveform that has one peak. On the other hand, when a combined wave is detected as the first incoming wave, the CIR waveform of the first incoming wave can be a waveform that has a plurality of peaks. Whether the CIR waveform of the first incoming wave has one peak or a plurality of peaks can be determined in accordance with a difference between the delay time of the first component and the delay time of the second component.

When the combined wave is detected as the first incoming wave, the estimation accuracy of the positional parameters deteriorates further than when the direct wave is detected as the first incoming wave. Accordingly, it can be said that the larger the difference between the delay time of the first component and the delay time of the second component is, the higher the reliability is.

Correlation of CIR Waveform

The reliability parameter may be derived based on the correlation of the CIR waveform in a certain pair of antennas among the plurality of antennas included in the communication unit 220. When a combined wave of the direct wave and the delay wave is received by the plurality of antennas included in the communication unit 220, a phase relation between the direct wave and the delay wave can differ between the antennas despite a distance which is short between the antennas. As a result, each CIR waveform in each antenna can be different. That is, the difference in the CIR waveform in a certain pair of antennas means reception of a combined wave in at least one antenna in the pair of antennas. When the combined wave is detected as the first incoming wave, that is, a specific component corresponding to the direct wave is not detected, the estimation accuracy of the position parameter deteriorates.

For example, the reliability parameter may be a correlation coefficient between the CIR obtained based on a received signal received from a certain antenna and the CIR obtained based on a received signal received by another antenna among the plurality of antennas included in the communication unit 220. In this case, for the reliability parameter, it is determined that the lower the correlation coefficient is, the lower the reliability is, and it is determined that the higher the correlation coefficient is, the higher the reliability is. The correlation coefficient includes, for example, a Pearson correlation coefficient.

Supplement

Hereinafter, supplement related to a specific example of the reliability parameter to be subsequently described will be described.

First, each of a plurality of sampling points included in the CIR is called a component below. That is, the CIR is assumed to include a CIR value of each delay time as a component. A form of the CIR, more specifically, a form of a chronological change in the CIR value, is called a CIR waveform.

Of a plurality of components included in the CIR, a component of specificity is also called a specific component below. The specific component is a component corresponding to the first incoming wave. The specific component is related to the first incoming wave and is detected in accordance with the above-described predetermined detection reference. For example, the specific component is a component in which an amplitude or power serving as a CIR value first exceeds a predetermined threshold among the plurality of components included in the CIR. Hereinafter, the predetermined threshold is also called a fast path threshold.

A time corresponding to a delay time of a specific component is used as a reception time of the first incoming wave to measure a distance. A phase of the specific component is used as a phase of the first incoming wave to estimate an arrival angle of a signal.

For the plurality of antennas included in the communication unit 220, the communication unit 220 in a line of sight (LOS) state and the communication unit 220 in a non-line of sight (NLOS) state are mixed.

The LOS state indicates a prospect between the antenna of the portable device 10 and the antenna of the in-vehicle device 20. In the LOS state, reception power of the direct wave is the highest. Therefore, there is a possibility of a reception side successfully detecting the direct wave as the first incoming wave.

The NLOS state indicates no prospect between the antenna of the portable device 10 and the antenna of the in-vehicle device 20. In the NLOS state, there is a possibility of reception power of the direct wave being lower than the other. Therefore, there is a possibility of a reception side failing to detect the direct wave as the first incoming wave.

When the communication unit 220 is in the NLOS state, reception power of the direct wave in the signal arriving from the portable device 10 is less than that of noise. Accordingly, although the direct wave is successfully detected as the first incoming wave, a phase and a reception time of the first incoming wave may be changed due to an influence of the noise. In this case, measurement accuracy and estimation accuracy of an arrival angle may deteriorate.

Further, when the communication unit 220 is in the NLOS state, reception power of the direct wave is lower than when the communication unit 220 is in the LOS state. Thus, detection of the direct wave as the first incoming wave may fail. In this case, the measurement accuracy and the estimation accuracy of an arrival angle may deteriorate.

Difference Between Delay Time of Specific Component and Delay Time of Component with Maximum CIR Value Accordingly, the reliability parameter may be a difference between a delay time of a specific component and a delay time of a component with a maximum CIR value in the CIR.

When the communication unit 220 is in the LOS state, the CIR value of the direct wave is the largest. Therefore, the component with a maximum CIR value in the CIR is included in a set corresponding to the direct wave.

On the other hand, when the communication unit 220 is in the NLOS state, the CIR value of the delay wave can be greater than the CIR value of the direct wave. When the communication unit 220 is in the NLOS state, an obstacle object is on the way of the fast path. In particular, when a human body is on the way of the fast path and the direct wave passes through the human body, the direct wave considerably attenuates. In this case, a component with the maximum CIR value in the CIR is not included in the set corresponding to the direct wave.

Whether the communication unit 220 is in the LOS state or the NLOS state can be determined in accordance with a difference between the delay time of the specific component and the delay time of the component with the maximum CIR value in the CIR.

This is because when the communication unit 220 is in the LOS state, the difference can decrease. Further, this is because when the communication unit 220 is in the NLOS state, the difference can increase.

The specific example of the reliability parameter according to the embodiment has been described above. Next, exemplary operation processes of the system 1 according to the embodiment will be described in order with reference to FIGS. 6 to 8.

3. Exemplary Operation Process

Figure 6:
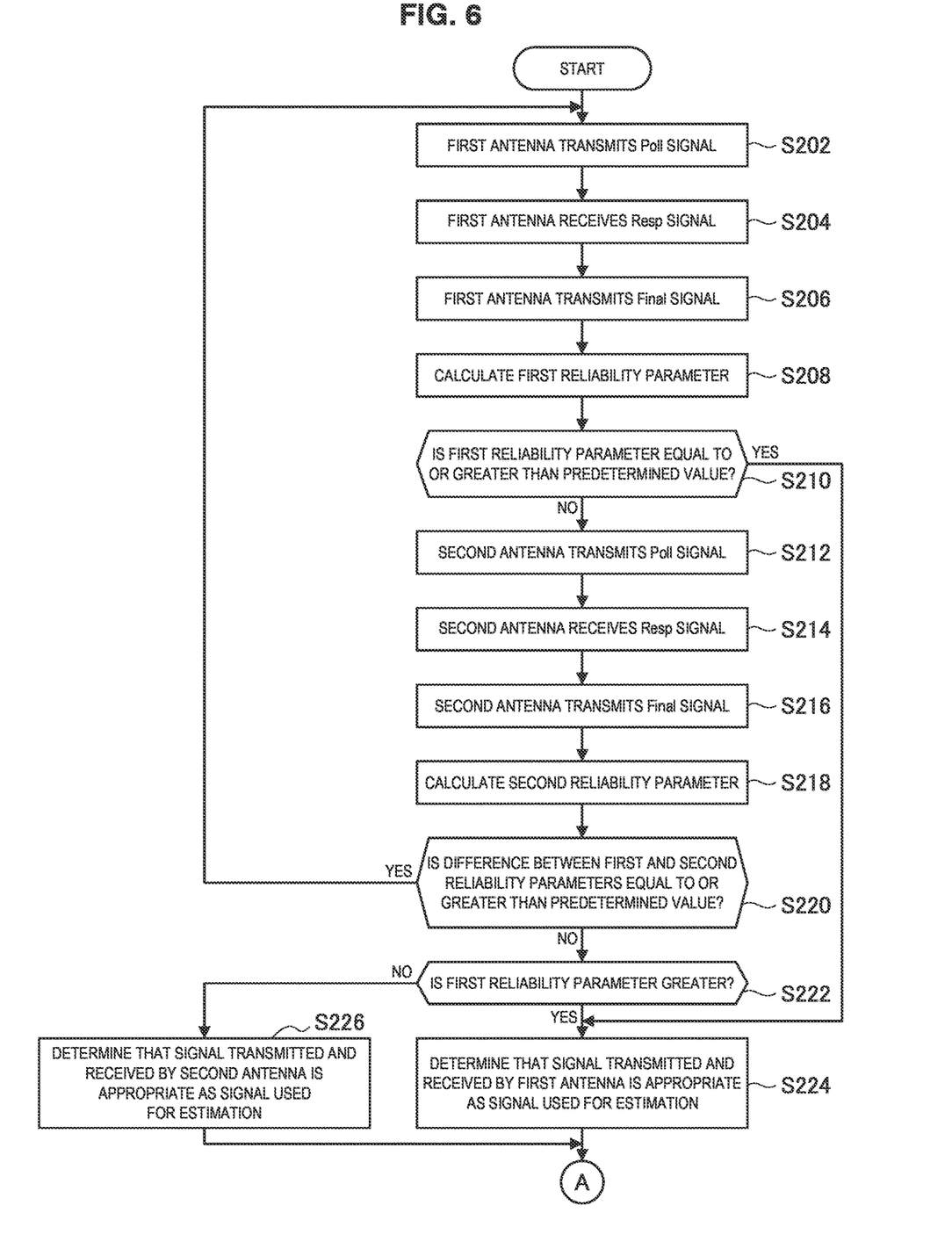
FIG. 6 is a diagram illustrating an example of a flow of a process of determining whether signals transmitted and received by antennas are appropriate as signals used to estimate a positional relation according to the embodiment.

FIG. 6 is a diagram illustrating an example of a flow of a process of determining whether signals transmitted and received by antennas are appropriate as signals used to estimate a positional relation according to the embodiment. In FIG. 6, a first antenna is assumed to be the antenna 120A of the portable device 10 and a second antenna is assumed to be the antenna 120B of the portable device 10 in description.

In the following description, a reliability parameter based on signals transmitted and received by the antenna 120A of the portable device 10 is referred to as a first reliability parameter and a reliability parameter based on signals transmitted and received by the antenna 120B of the portable device 10 is referred to as a second reliability parameter. A reliability parameter based on signals with directivity transmitted and received by a combination of the antennas 120A and 120B of the portable device 10 is referred to as a third reliability parameter. The first, second, and third reliability parameters may be a single reliability parameter among the above-described various reliability parameters or may be a combination of the plurality of reliability parameters.

First, the antenna 120A of the portable device 10 transmits the Poll signal to the antenna 220A of the in-vehicle device 20 (S202).

Subsequently, the antenna 120A of the portable device 10 receives the Resp signal transmitted from the antenna 220A as a reply to the Poll signal (S204).

Subsequently, the antenna 120A of the portable device 10 transmits the Final signal as a reply to the Resp signal to the plurality of antennas of the in-vehicle device 20 (S206).

Then, the calculation unit 130 calculates the reliability parameter based on the received Resp signal (S208). The calculation unit 230 may calculate the reliability parameter based on the Poll signal or the Final signal.

Then, the determination unit 140 determines whether the reliability parameter calculated in S208 is equal to or greater than a predetermined value. When the reliability parameter is equal to or greater than the predetermined value, the process proceeds to S224 (Yes in S210). When the reliability parameter is less than the predetermined value, the process proceeds to S212 (No in S210).

When the reliability parameter is less than the predetermined value (No in S210), the antenna 120B of the portable device 10 transmits the Poll signal to the antenna 220A of the in-vehicle device 20 (S212).

Subsequently, the antenna 120B of the portable device 10 receives the Resp signal transmitted from the antenna 220A as a reply to the Poll signal (S214).

Subsequently, the antenna 120B of the portable device 10 transmits the Final signal as a reply to the Resp signal to the plurality of antennas of the in-vehicle device 20 (S216).

Then, the calculation unit 130 calculates the reliability parameter based on the received Resp signal (S218). As in S208, the calculation unit 230 may calculate the reliability parameter based on the Poll signal or the Final signal.

Here, the determination unit 140 determines whether a difference between the first and second reliability parameters is equal to or greater than a predetermined value (S220). When the difference is equal to or greater than the predetermined value, the process returns to S202 and the control unit 110 controls the transmission and reception of the signals between the antenna 120A of the portable device 10 and the plurality of antennas of the in-vehicle device 20 again (Yes in S220). When the difference is less than the predetermined value, the process proceeds to S222 (No in S220).

When the difference is less than the predetermined value (No in S220), the determination unit 140 compares the first reliability parameter with the second reliability parameter to determine whether the first reliability parameter is greater (S222). When the first reliability parameter is greater, the process proceeds to S224 (Yes in S222). When the first reliability parameter is less or equal, the process proceeds to S226 (No in S222).

When the first reliability parameter is greater (Yes in S222), the determination unit 140 determines that the signal transmitted or received by the antenna 120A is a signal appropriate as a processing target (S224). Then, the portable device 10 ends the process of determining whether the signal transmitted or received by the antenna is appropriate as the signal used to estimate the positional relation.

When the first reliability parameter is less or equal (No in S222), the determination unit 140 determines that the signal transmitted or received by the antenna 120B is a signal appropriate as a processing target (S226). Then, the portable device 10 ends the process of determining whether the signal transmitted or received by the antenna is appropriate as the signal used to estimate the positional relation.

The determination reference of the first reliability parameter in the process of S210 may be removed and each of the first and second antennas may transmit and receive the signal. In this case, the determination unit 140 may compare the first reliability parameter based on the signal transmitted or received by the first antenna with the second reliability parameter based on the signal transmitted or received by the second antenna and may determine that the signal with higher reliability is a signal for estimating the positional relation between the portable device 10 and the in-vehicle device 20. The processing unit 150 may estimate the positional relation between the portable device 10 and the in-vehicle device 20 using each of the signal for calculating the first reliability parameter and the signal for calculating the second reliability parameter. Thus, the processing unit 150 can estimate the positional relation between the portable device 10 and the in-vehicle device 20 based on the signal with higher reliability more simply.

Next, an example of determination related to signals with reliability transmitted and received by a combination of the antennas 120A and 120B will be described with reference to FIG. 7.

Figure 7:
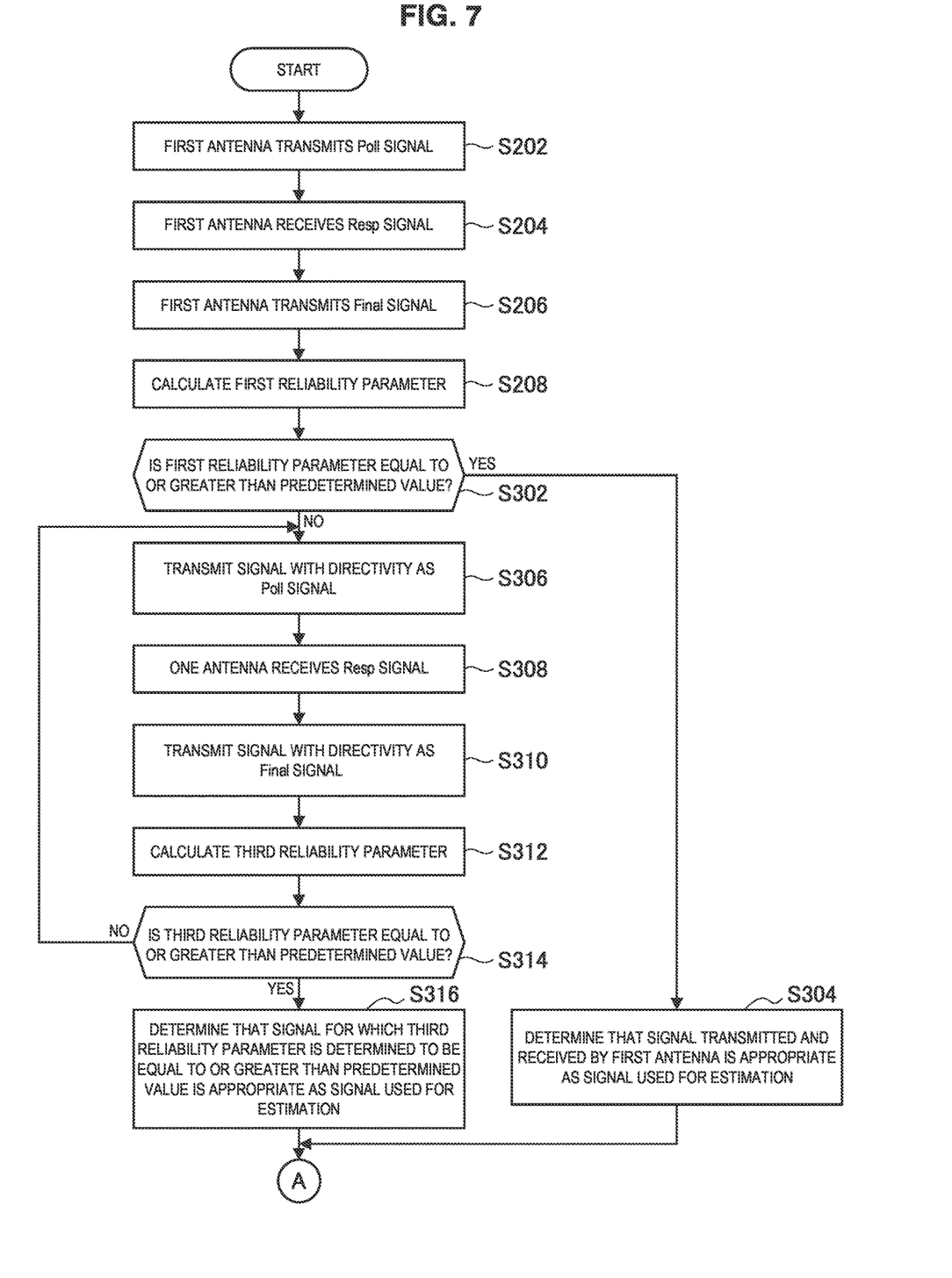
FIG. 7 is a diagram illustrating an example of a flow of a process of determining whether signals with directivity transmitted and received by a plurality of antennas are appropriate as signals used to estimate a positional relation according to the embodiment.

FIG. 7 is a diagram illustrating an example of a flow of a process of determining whether signals with directivity transmitted and received by a plurality of antennas are appropriate as signals used to estimate a positional relation according to the embodiment.

First, description of the repeated process in FIG. 6 will be omitted in FIG. 7. Specifically, since S202 to S208 in FIG. 6 are the same as those of FIG. 7, description thereof will be omitted.

The determination unit 140 determines whether the first reliability parameter calculated by the calculation unit 130 is equal to or greater than a predetermined value (S302). When the first reliability parameter is equal to or greater than the predetermined value (Yes in S302), the process proceeds to S304. When the first reliability parameter is less than the predetermined value (No in S302), the process proceeds to S306.

When the first reliability parameter is equal to or greater than the predetermined value (Yes in S302), the determination unit 140 determines that the signal transmitted or received by the antenna 120A is appropriate as a signal used for estimation (S304). Then, the portable device 10 ends the process of determining whether the signal transmitted or received by the antenna is appropriate as the signal used to estimate the positional relation.

When the first reliability parameter is less than the predetermined value (No in S302), the antennas 120A and 120B transmits the signal with directivity generated by beamforming as the Poll signal to the in-vehicle device 20 (S306).

Subsequently, at least one of the antennas 120A and 120B receives the Resp signal from the antenna of the in-vehicle device 20 (S308).

Subsequently, the antenna 120A or 120B transmits the signal with directivity as the Final signal to the antenna of the in-vehicle device 20 (S310).

Then, the calculation unit 130 calculates the third reliability parameter based on the received Resp signal (S312).

Subsequently, the determination unit 140 determines whether the third reliability parameter calculated in S312 is equal to or greater than a predetermined value (S314). When the third reliability parameter is equal to or greater than the predetermined value (Yes in S314), the process proceeds to S316. When the third reliability parameter is less than the predetermined value (No in S314), the process returns to S306. Here, when the process returns to S306, the antennas 120A and 120B may correct a direction, an angle, or the like and transmits the signal with directivity again.

When it is determined that the third reliability parameter is equal to or greater than the predetermined value (Yes in S314), the determination unit 140 determines that the signal used to calculate the third reliability parameter is appropriate as the signal used to estimate the positional relation (S316). Then, the portable device 10 ends the process of determining whether the signal transmitted or received by the antenna is appropriate as the signal used to estimate the positional relation.

As in FIG. 6, the determination reference of the first reliability parameter in the process of S302 may be removed and each of the first and second antennas may transmit and receive the signal. In this case, the determination unit 140 may compare the first reliability parameter which is based on the signal transmitted or received by the first antenna with the third reliability parameter which is based on the signal transmitted or received by the combination of the first and second antennas and may determine that the signal with higher reliability is a signal for estimating the positional relation between the portable device 10 and the in-vehicle device 20. The processing unit 150 may estimate the positional relation between the portable device 10 and the in-vehicle device 20 using each of the signal for calculating the first reliability parameter and the signal for calculating the third reliability parameter. Thus, the processing unit 150 can estimate the positional relation between the portable device 10 and the in-vehicle device 20 based on the signal with higher reliability more simply.

Figure 8:
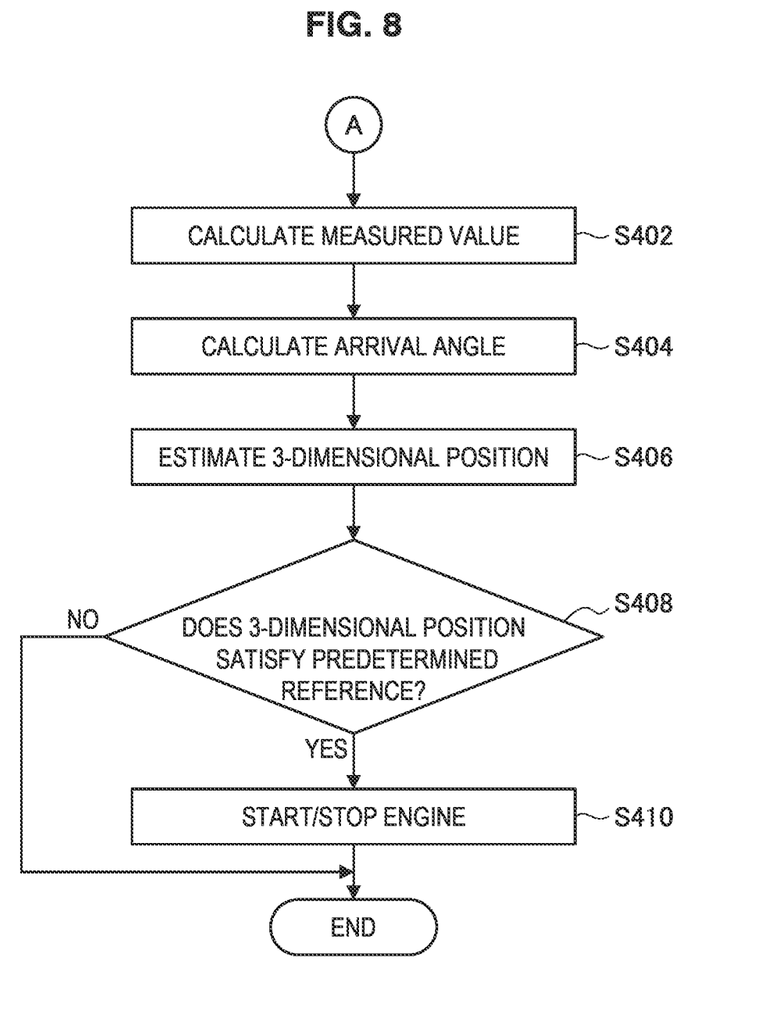
FIG. 8 is a diagram illustrating a flow of a process of estimating a positional relation between a portable device 10 and an in-vehicle device 20 according to the embodiment.

FIG. 8 is a diagram illustrating a flow of a process of estimating a positional relation between a portable device 10 and an in-vehicle device 20 according to the embodiment. An example in which the signals transmitted and received between the antenna 120B of the portable device 10 and the plurality of antennas of the in-vehicle device 20 are determined to be appropriate as processing targets will be described.

First, the processing unit 250 calculates a measured value which is a distance between the portable device 10 and the in-vehicle device 20 based on the signals transmitted and received between the antenna 120B of the portable device 10 and the antenna 220A of the in-vehicle device 20 (S402).

Subsequently, the processing unit 250 calculates an arrival angel of the signal based on the signals transmitted and received between the antenna 120B of the portable device 10 and the plurality of antennas of the in-vehicle device 20 (S404).

Subsequently, the processing unit 250 estimates a 3-dimensional position of the portable device 10 based on the measured value calculated in S402 and the arrival angle of the signal calculated in S404 (S406).

Then, the processing unit 250 determines whether the 3-dimensional position of the portable device 10 estimated in S406 satisfies a predetermined reference (S408). When it is determined that the 3-dimensional position satisfies the predetermined reference (Yes in S408), the process proceeds to S410. When it is determined that the 3-dimensional position does not satisfy the predetermined reference (No in S408), the in-vehicle device 20 ends the process.

When it is determined that the 3-dimensional position satisfies the predetermined reference (Yes in S408), the control unit 210 performs control related to starting or stopping of an engine of the vehicle in which the in-vehicle device 20 is mounted and the in-vehicle device 20 ends the process. As an example of the process based on the positional relation between the portable device 10 and the in-vehicle device 20, the starting or stopping of the engine is exemplified, but the present invention is not limited to this example. For example, the process based on the positional relation between the portable device 10 and the in-vehicle device 20 may be unlocking or locking of a door of the vehicle, or the like. The function related to this control may be implemented using another device.

In the control according to the embodiment, the control unit 110 controls the mode for transmission and reception of the signals by the plurality of antennas, and thus the processing unit 150 can estimate the positional relation between the portable device 10 and the in-vehicle device 20 with higher accuracy based on the signals in which an influence of the multi-paths is small.

4. Supplement

The preferred embodiments of the present invention have been described in detail above with reference to the appended drawings, but present invention is not limited thereto. It should be understood by those skilled in the art that various changes and alterations may be made within the scope of the technical spirits described in the appended claims and the various changes and alternations, of course, pertain to the technical scope of the present invention.

For example, the series of processes performed by the devices described in the present specification may be implemented using any of software, hardware, and a combination of software and hardware. A program of the software is stored in advance, for example, a recording medium (non-transitory medium) provided inside or outside of each device. For example, each program is read to a RAM at the time of execution in a computer and is executed by a processor such as a CPU. Examples of the recording medium include a magnetic disk, an optical disc, a magneto-optical disc, and a flash memory. The computer program may be delivered via a network, for example, without using a recording medium.

The processes described with reference to the sequence diagrams may not necessarily be performed in the order described in the drawing. For example, some of the processing steps may be performed in parallel. Additional processing steps may be adopted and some of the processing steps may be omitted.

What is claimed is:

1. A communication device, comprising:
   at least one processor configured to control transmission and reception of signals by at least first and second antennas in conformity with a specific communication standard,
   wherein the processor controls a mode for transmission and reception of the signals by the first and second antennas in accordance with the signals transmitted to and received from a second communication device,
   the signals transmitted and received are for a process of estimating a positional relation between the communication device and the second communication device,
   when a multi-path environment of a signal received by a first one of the first and second antennas does not satisfy a predetermined reference, the processor performs control such that a second one of the first and second antennas transmits and receives the signals,
   the processor is further configured to calculate a reliability parameter indicating an index of whether the signals transmitted and received by the first or second antenna are appropriate for use to estimate the positional relation;
   the processor is further configured to determine, as a determination result, whether the signals used to calculate the reliability parameter are appropriate for use to estimate the positional relation, based on the reliability parameter, and
   the processor controls the mode for transmission and reception of the signals by the first and second antennas based on the determination result.

2. The communication device according to claim 1, wherein the processor controls the mode for transmission and reception of the signals by the first and second antennas in accordance with the multi-path environment of the signals received from the second communication device.

3. The communication device according to claim 1, wherein the process of estimating the positional relation between the communication device and the second communication device is performed based on signals transmitted and received by at least one of the first and second antennas.

4. The communication device according to claim 1, wherein the processor controls at least one of the first and second antennas such that the signals are transmitted and received again when a difference between the reliability parameter based on the signal received by the first antenna and the reliability parameter based on the signal received by the second antenna is equal to or greater than a predetermined value.

5. The communication device according to claim 4, wherein the processor determines that a signal with higher reliability based on the reliability parameter among the signal received by the first antenna and the signal received by the second antenna is appropriate for use to estimate the positional relation.

6. The communication device according to claim 1, wherein the reliability parameter includes an index indicating a magnitude of noise of the received signals.

7. The communication device according to claim 1, wherein the processor controls the first and second antennas such that a signal with directivity generated due to radio wave interference of signals transmitted from the first and second antennas is transmitted to the second communication device in accordance with the multi-path environment of the signals received from the second communication device.

8. The communication device according to claim 7, wherein the processor controls the first and second antennas such that the signal with directivity is transmitted to the second communication device, based on positional information of the second communication device included in the signals received from the second communication device.

9. The communication device according to claim 7, wherein the processor controls the first and second antennas such that the signal with directivity is transmitted at omni-azimuths including a position of the second communication device.

10. The communication device according to claim 1, wherein the process of estimating the positional relation between the communication device and the second communication device includes a process of estimating an arrival angle of signals transmitted and received by at least one of the first and second antennas.

11. The communication device according to claim 1, wherein the process of estimating the positional relation is used for control based on the positional relation between the communication device and the second communication device.

12. The communication device according to claim 1, wherein the signals include wireless signals in conformity with ultra-wideband wireless communication.

13. A communication device, comprising:
    at least one processor configured to control transmission and reception of signals by an antenna in conformity with a specific communication standard,
    wherein the processor controls the antenna included in the communication device such that a signal for giving an instruction for control related to a mode for transmission and reception of the signals by at least first and second antennas of a second communication device is transmitted to the other second communication device in accordance with the signals transmitted to and received from the second communication device, the signals transmitted to and received from the second communication device are for a process of estimating a positional relation between the communication device and the second communication device, when a multi-path environment of a signal received from a first one of the first and second antennas does not satisfy a predetermined reference, the processor performs control such that a signal is received from a second one of the first and second antennas, the processor is further configured to calculate a reliability parameter indicating an index of whether the signals received from the first or second antenna are appropriate for use to estimate the positional relation;

the processor is further configured to determine, as a determination result, whether the signals used to calculate the reliability parameter are appropriate for use to estimate the positional relation, based on the reliability parameter, and the processor controls the mode for transmission and reception of the signals from the first and second antennas based on the determination result.

14. A control device, comprising:

at least one processor configured to control transmission and reception of signals by a plurality of antennas in conformity with a specific communication standard, wherein the processor controls a mode for transmission and reception of the signals by the plurality of antennas in accordance with the signals transmitted to and received from a second communication device, the processor is further configured to estimate a position of the second communication device based on the signals transmitted to and received from the second communication device by the plurality of antennas and a reliability parameter indicating an index of whether the signals are appropriate for use to estimate a positional relation, the signals transmitted and received are for a process of estimating the positional relation with the second communication device, when a multi-path environment of a signal received by a first one of the plurality of antennas does not satisfy a predetermined reference, the processor performs control such that a second one of the plurality of antennas transmits and receives the signals, the processor is further configured to calculate the reliability parameter indicating the index of whether the signals are appropriate for use to estimate the positional relation;

the processor is further configured to determine, as a determination result, whether the signals used to calculate the reliability parameter are appropriate for use to estimate the positional relation, based on the reliability parameter, and the processor controls the mode for transmission and reception of the signals by the plurality of antennas based on the determination result.

* * * * *